United States Patent [19]
Kramer

[11] 3,915,460
[45] Oct. 28, 1975

[54] PIPE SEALING JOINT, CLOSURE RING FOR SUCH A JOINT AND APPLICATION OF SAID JOINT IN PARTICULAR TO HYDROCARBON-CONVEYING PIPES

[75] Inventor: Kurt Kramer, Gudingen, Germany

[73] Assignee: Pont-a-Mousson S. A., Pont-A-Mousson, France

[22] Filed: Oct. 24, 1973

[21] Appl. No.: 409,117

[30] Foreign Application Priority Data
Oct. 26, 1972 France .............................. 72.38081

[52] U.S. Cl. ............ 277/58; 277/207; 277/DIG. 2; 285/230
[51] Int. Cl.² ........................................ F16J 15/12
[58] Field of Search ............ 285/55, 230, 231, 345, 285/351; 277/207, 207 A, 235, 188, 189

[56] References Cited
UNITED STATES PATENTS
2,437,632   3/1948   Wolfram ........................ 285/351
2,684,119   7/1954   Brown ............................. 277/235
2,966,539   12/1960  Sears et al. ................... 277/207 A FOREIGN PATENTS OR APPLICATIONS
372,669   5/1932   United Kingdom ................ 285/231

Primary Examiner—Robert I. Smith
Attorney, Agent, or Firm—Sughrue, Rothwell, Mion, Zinn & Macpeak

[57] ABSTRACT

Pipe sealing joint between a pipe male end and a pipe socket. The joint comprises a sealing element having at least one portion in the cavity of the socket and radially compressed between the male end and the socket and means for protecting the sealing element. The protecting means comprise a protective ring of flexible material at the inner end of the cavity and at least one closure ring which is of a material resisting corrosion and is disposed in the cavity between the sealing element and the protective ring.

19 Claims, 12 Drawing Figures

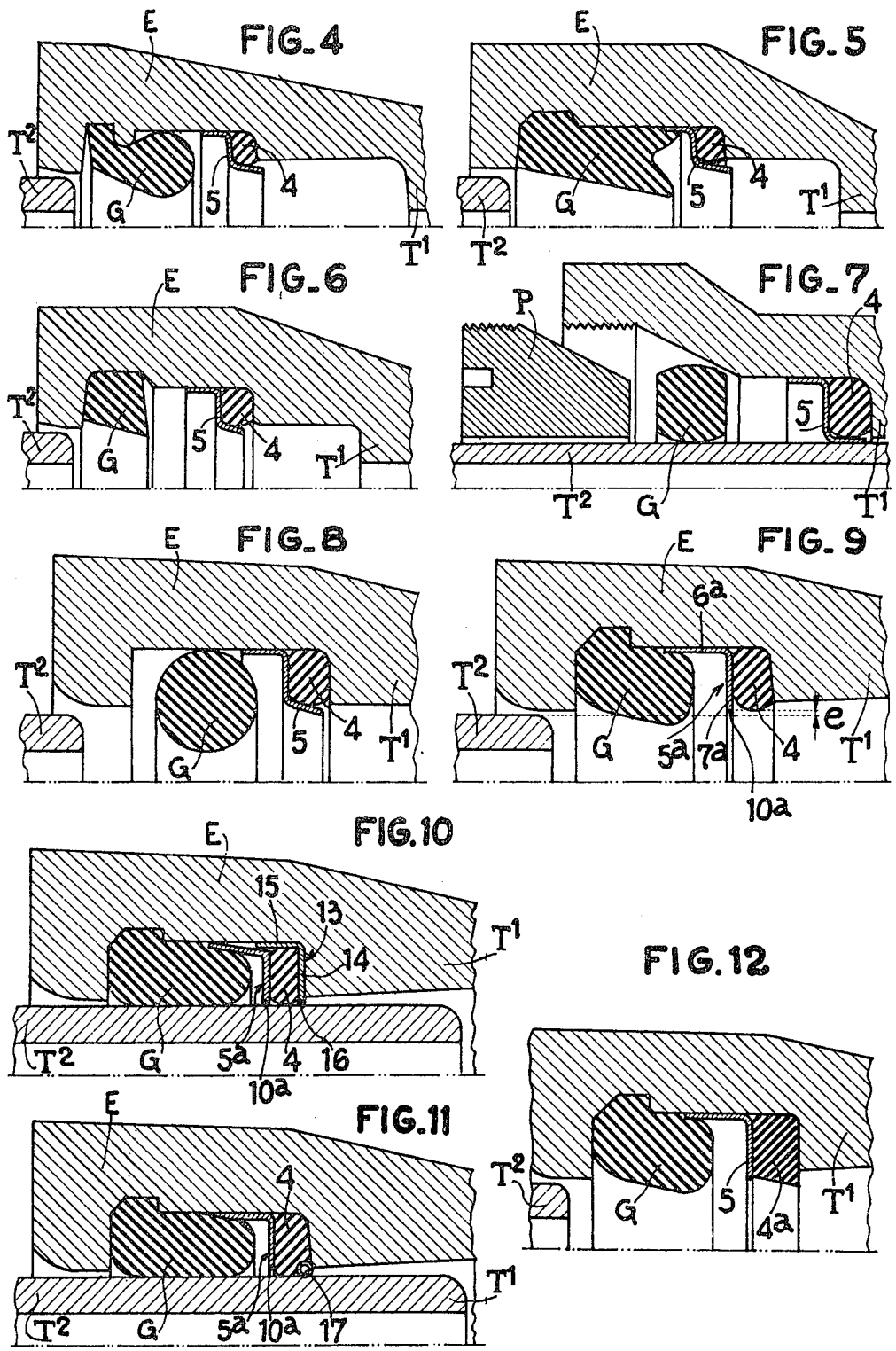

PIPE SEALING JOINT, CLOSURE RING FOR SUCH A JOINT AND APPLICATION OF SAID JOINT IN PARTICULAR TO HYDROCARBON-CONVEYING PIPES

The present invention relates to sealing joints for pipes and more particularly to sealing joints comprising a sealing element compressed radially and means for protecting said element against corrosive agents.

The adverse effect of hydrocarbons on currently-employed elastomers is well known. This effect is in particular manifested by considerable attack of sealing elements of natural rubber when trials have been carried out for transporting gas containing hydrocarbons by means of conduits having joints equipped with such sealing elements. In some cases, an impregnation and then a swelling of the sealing elements occurred which resulted in a tears in the latter. In other cases, in which the pipe transported alternately gases charged with benzol and dry gases, the following phenomenon was observed: the benzol-containing phase impregnated the sealing element and made it swell and the non-benzol phase dried it by re-absorption of the benzol by the gas, this drying resulting in a shrinkage of the sealing element which produced leaks.

It is however important to note that the problem is not at all posed in the same terms in respect of conduits having mechanical sealing joints compressed axially and conduits having automatic sealing joints compressed radially. As concerns the first-mentioned case, the surface of the sealing element in contact with the gases is extremely small owing to the fact that the sealing element bears against the end of the cavity of the socket and it has been possible to find a simple solution: it comprises protecting this exposed surface by means of a cap constituted by a material having an elastic or plastic nature and resisting the hydrocarbons. Thus this cap has been made from lead or from a suitable plastics material such as polyamide. Such an arrangement is, for example, disclosed in the French Pat. No. 1,295,728, and has given satisfaction. It is well-suited to sealing joints compressed axially by a seal-pressing means in which the surface of the sealing element exposed to the gases is relatively small and may be more easily covered with such a protective cap.

This is not the case in respect of automatic sealing joints compressed radially in which the radially-compressed sealing element is exposed to attack from the gases on a relatively large surface. This exposed surface indeed comprises the whole of the annular region between the smooth or male end of a pipe and the inner cylindrical surface of the socket of the other pipe in which the sealing element is disposed. In this case, the utilization of a protective cap of the aforementioned type is impossible, since this cap would prevent a correct assembly of the sealing element between the male end and the socket of the pipes and it would constitute a hindrance owing to its lack of elasticity. Such a joint would therefore be ineffective.

There was then proposed, as disclosed for example in French Pat. No. 1,569,442, an arrangement for protecting sealing elements of automatic radially-compressed joints. This arrangement comprises deliberately sacrificing a sealing element, termed a secondary sealing element, to the attack of the hydrocarbons by placing it in front of the main sealing element with the side thereof exposed to the gases. The swelling of this secondary sealing element thus protects the main sealing element from the gases. This arrangement, although original in its principle, has not shown itself to be completely satisfactory in its applications. Indeed, although the material of this secondary sealing element is indeed insoluble in the hydrocarbons, though it swells under their action, this material is not fully impermeable. Consequently, the secondary sealing element in fact merely has a retarding action and at the end of this action the main sealing element is in turn attacked.

An object of the present invention is therefore to provide in this type of sealing joint means for reinforcing this retarding action so as to protect as far as possible the main sealing element from the contact of the harmful hydrocarbons or other corrosive agents.

The invention provides a sealing joint for pipes between the male end of one pipe and the socket of another pipe, comprising a sealing element having at least one portion disposed in a cavity of the socket and radially compressed between the male end and the socket, and means for protecting the sealing element comprising a ring of flexible material placed in the same cavity as the sealing element at the inner end of the cavity adjacent the body part of the pipe, wherein the protecting means further comprise at least one closure ring which is of a material resisting corrosion and disposed in the cavity of the socket between the sealing element and the protective ring.

This closure ring thus constitutes with the flexible ring an annular screen of separation between the sealing element and the protective elastomer ring. This composite annular screen is impermeable to the corrosive agents and therefore serves to protect the sealing elements of radially-compressed sealing joints from attack by these agents.

Another object of the invention is to provide a closure ring of the type defined hereinbefore.

Another object of the invention is to provide an application of a sealing joint of the considered type to pipes pertaining to piping or gases containing hydrocarbons.

Further features and advantages of the invention will be apparent from the ensuing description with reference to the accompanying drawings.

In the drawings:

FIGS. 4–11 are partial axial sectional views of modifications of the joint according to the invention corresponding to FIG. 1 in respect of FIGS. 4–6 and 8–9 and to FIG. 2 in respect of FIGS. 7, 10 and 11, and FIG. 12 is a partial axial sectional view of a modification of the form of the protective ring.

Figure 1:
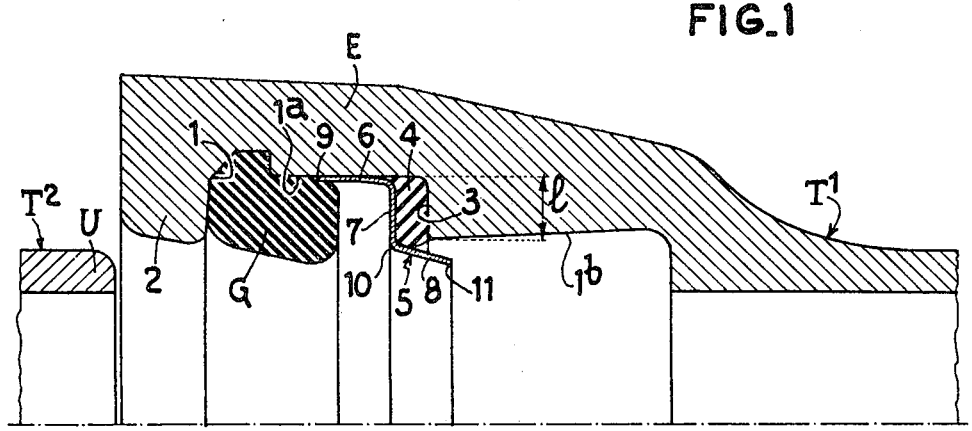
FIG. 1 is a sectional view of a sealing joint according to the invention before the male end has been inserted in the socket.

The sealing joint illustrated in FIG. 1 is designed to ensure a seal between a pipe $T^1$ having a socket E and a pipe $T^2$ whose male end U is shown at the entrance of the socket E.

The sealing element of this joint is a sealing element G adapted to be compressed radially which is placed in a cavity 1 formed adjacent the outer end of the socket E. This sealing element has an outer annular heel portion which enables the element to be anchored in a groove of the cavity 1. This cavity is defined, at the end adjacent the outer end of the socket, by a flange 2 which closes the entrance of this socket and, at the inner end adjacent the body portion of the pipe $T^1$, by a shoulder 3. Adjacent this shoulder 3 the cavity has a cylindrical wall $1a$ The shoulder 3 is perpendicular to the axis of the pipe and has a radial width or dimension $l$ and connects the cavity 1 to a second cavity $1b$ which constitutes the cavity proper of the socket since it is intended to receive the male or smooth end U of the pipe $T^2$ with a slight clearance.

The sealing joint further comprises a ring 4 of elastomer having a generally rectangular shape (this shape could be square in a modification). This ring is placed both against the shoulder 3 and against the cylindrical surface $1a$ of the cavity 1. Its dimension perpendicular to the axis of the pipe is slightly greater than the width $l$ of the shoulder 3 which defines the cavity 1. The insertion of the male end U of the pipe $T^2$ in the socket E of the pipe $T^1$ therefore cannot occur without a slight radial compression of the ring 4. Note that this greater dimension is not essential and, if provided, it must not constitute a major hindrance to the assembly; it is, however, an arrangement which has its advantages bearing in mind the function performed by this ring 4 explained hereinafter.

The sealing joint also comprises a fluidtight closure ring 5 of polyamide which is, for example, formed from a thin sheet of polyamide or obtained by moulding.

The indicated material is, however, not intended to be limitative and the fluid tight closure ring may be made from another material provided that it is impermeable with respect to the hydrocarbons, insensitive to their action and has sufficient flexibility. The ring 5 is of revolution about an axis coinciding with the axis of the pipes when it is in position and it has a meridian section having a general shape of a double L comprising an outer cylindrical wall or lip portion 6 which is slightly frustoconical and diverges in the direction of its free end, an annular web portion 7 perpendicular to the axis, and an inner frustoconical wall or lip portion 8 which is oriented axially in the direction opposed to the outer lip portion 6 and converges in the direction of its free end.

The ring 5 is disposed inside the cavity 1 of the socket in such manner that its web portion 7 and its inner lip portion 8 bear against the two free faces of the ring 4 and its outer lip portion 6 bears against the cylindrical surface $1^a$ of the cavity 1.

The outer lip portion 6 has a free edge 9 which has a diameter very slightly greater than that of the cylindrical surface $1^a$ of the cavity 1 of the socket. This dimension guarantees that it is applied against this cylindrical surface $1^a$ of the cavity without clearance.

Further, the lip portion 6 has such axial length that it is wedged between the sealing element G and the cylindrical surface $1^a$ of the cavity 1. Thus the radial compression of the sealing element G when introducing the male or smooth end U in the socket E, contributes to the perfect application of this lip portion 6 of the closure ring 5 against the socket. However, it is certain that this introduction of the lip portion 6 between the sealing element G and the cylindrical surface of the cavity 1 must not be excessive, otherwise this might have an adverse effect on the proper application of the sealing element G against the socket, on which application the sealing properties of the joint depend. Moreover, this introduction, although advantageous, is not absolutely essential.

The edge 10 defined by the intersection of the annular web portion 7 and the inner lip portion 8 has a diameter slightly greater than that of the male end U and the free end edge 11 of the lip portion 8 has a diameter slightly less than that of this male end U. Thus, when the latter enters the socket, the edge 11 grips the male end u and is assisted in this possibly by the slight radial compression of the elastomer ring 4.

A connection between the ring 4 and the closure ring 5 is not essential, but could be provided, for example, by adhesion. In any case, the only part of the closure ring 5 which could be thus connected is the center portion of its annular web portion 7.

Figure 2:
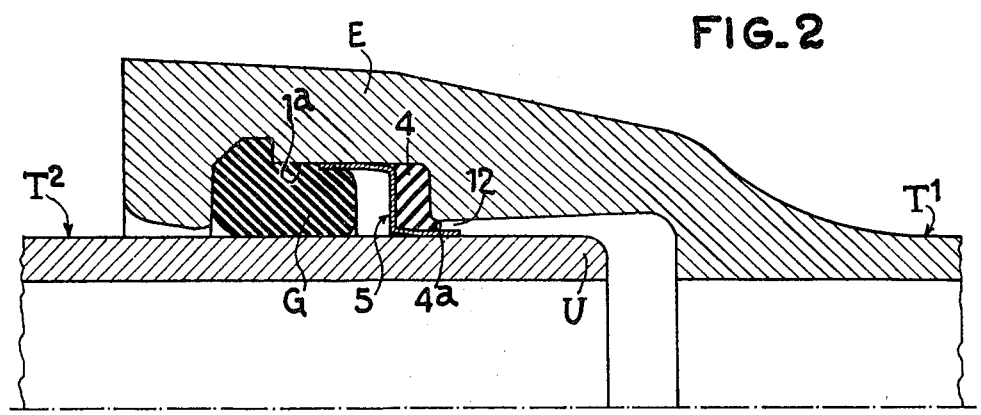
FIG. 2 is a similar view of the same joint after the male end has been inserted.

As illustrated in FIG. 2, the penetration of the male end U of the pipe $T^2$ in the socket E of the pipe $T^1$ when assembling the pipes is accompanied, on one hand, by a bending of the frustoconical inner lip portion 8 of the ring 5 about its edge 10 which places this lip portion in a position which is roughly cylindrical or in any case much less convegent than before assembly and consequently causes the circular edge 11 of this lip portion 8 to grip the male end U and, on the other hand, by an application of this lip portion 8 against the ring 4 and consequently a radial compression of the ring 4 and a corresponding axial expansion. The latter expansion results, on one hand, in a flowing of a portion $4^a$ of the ring 4 in the free space 12 between the lip portion 8 and the cavity $1^b$ of the socket and, on the other hand, in a deformation of the web portion and outer lip portion of the ring 5 toward the main sealing element G.

Figure 3:
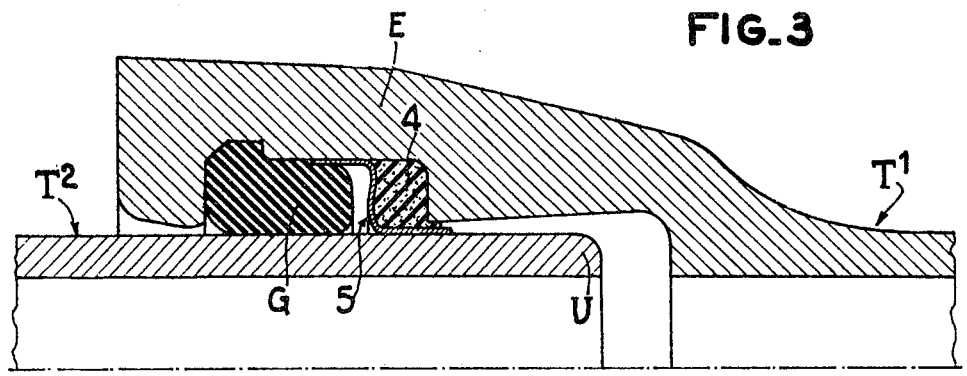
FIG. 3 is a similar view of this joint showing its condition after exposure to the hydrocarbons.

This assembly, when exposed to hydrocarbons, acts in the following manner, illustrated by FIG. 3: the elastomer of the ring 4 absorbs the hydrocarbons and swells; there is then a total application of the lip portion 8 of the closure ring 5 on the male end U and a deformation of the closure ring 5 toward the sealing element G, possibly until contact with this sealing element. Note, moreover, that in this case the pressure resulting from the deformation of the closure ring 5 against the sealing element G under the action of the hydrocarbons which swell the ring 4, contributes to the radial application of the sealing element G against the male end U and the socket E and thus improves, if necessary, the sealing qualities of the joint. The sole passages which might possibly give the hydrocarbons access to sealing element G are then dependent on the flexibility of the two edges 9 and 11 of the closure ring 5, this flexibility indeed conditioning the possibilities of a strict application of the two edges against respectively the socket of pipe $T^1$ and the male end of pipe $T^2$. All this of course depends very much on the manufacturing tolerances of the pipes $T^1$ and $T^2$ and of the closure ring 5. The general form of the parts and their dimensioning are in any case chosen to limit to the maximum extent the drawbacks of excessively wide tolerances.

There is thus obtained in any case, a limitation of the surface of the ring 4 exposed to the hydrocarbons, a practically perfect fluidtight protection of the sealing element G against the hydrocarbons ensured by the closure ring 5 and a support of this closure ring 5 by the mass of the ring 4 against which it is applied. Indeed, all that is required of the ring 4 is to maintain the closure ring 5 in position and to apply it in the position in which it ensures the best closure in, precisely, benefiting from the swelling of this ring 4 under the effect of the hydrocarbons to the attack of which it is deliberately sacrificed.

This application of the closure ring 5 by the ring 4 in the position imparting thereto the maximum closing effect between the socket E and the male end U presupposes a minimum independence between the ring 5 and the ring 4. The swelling of the latter must indeed promote the gripping of the male end U by the edge 11 or bring about, possibly, an axial translation of the median region 7 of the ring 5 without creating any risk of this ring 5 splitting or cracking and failing to perform its screening function.

Thus the protection afforded by the composite annular screen consisting of the ring 4 and ring 5 is very effective.

Tests have shown the advantageous action of the structure according to the invention. In a test employing benzol, after 12 days of exposure, the gain in weight of the sealing element G due to absorption of benzol was less than 1% whereas the weight of a non-protected reference sealing element increased by about 25%.

The sealing joint may in a general way be of any so called automatic type and be based on the principle of a radially compressed sealing element. This is, for example, the case of joints such as that shown in FIG. 4 which corresponds to French Pat. No. 1,172,962, that shown in FIG. 5 which corresponds to French Pat. No. 1,168,647, that shown in FIG. 6 which corresponds to French Pat. No. 1,432,706, or that shown in FIG. 7 which corresponds to French Pat. No. 2,094,278, in which the sealing element G is mounted by a thrust exerted by a sealing element-pressing means P which enables it to be placed in position only after introduction of the male end in the socket.

The joint may also be provided with a sealing element G of simply O-section without a heel portion for anchoring to the socket, as shown in FIG. 8.

Moreover, if the manufacturing tolerances are sufficiently narrow, a suitable protection may also be obtained with a ring 5a which has, as shown in FIG. 9, only a web portion 7a and an outer lip portion 6a identical to the web portion 7 and the lip portion 6 of the ring 5. In this case, the annular web portion 7a of this ring 5a must be moved as near as possible to the male end U and therefore reduce as far as possible the space $e$ between the inner edge 10a of the web portion 7a and the male end U.

In the modification shown in FIG. 10, there is provided, in addition to the ring 5a, means protecting the face of the ring 4 exposed to the hydrocarbons so as to ensure that, under the swelling action of said hydrocarbons, this ring does not flow in the same way as the ring 4 shown in FIG. 2 between the male end and the socket, since this would tend to produce cracking which might profoundly damage this ring. This protection is constituted by a cap 13 which surrounds the side of the ring 4 located against the body portion of the pipe $T^1$. This cap comprises a radial annular web portion 14 and a cylindrical outer lip portion 15. The web portion 14 must come very close to the male end so as to limit as far as possible the free space 16. To limit this flow of the material of the protective ring, another arrangement, similar to that disclosed in French Pat. No. 1,169,444, consists in protecting the exposed face of the ring 4 by means of an annular metal spring having substantially adjoining coils 17 shown in FIG. 11. It must be understood that the ring 4 may have different forms, for example a form 4a as shown in FIG. 12, having a rectangular trapezium section whose acute angle faces the male end U and in the direction of the body portion of the pipe $T^1$.

In any case, it is essential in all these applications that the exposure of a portion of the surface of the ring 4, however limited, be sufficent to result in a swelling of this ring with all its advantageous consequences for the application of the closure ring 5 in correct position.

It will be understood that by providing a suitable material for the annular protective screen 4–5, this sealing joint is of utility for pipings containing any corrosive fluid other than gases charged with hydrocarbons.

Having now described my invention what I claim as new and desire to secure by Letters Patent is:

1. A pipe sealing joint comprising a male end of a first pipe and a socket of a second pipe, the second pipe having a body portion axially adjacent to and rigid with the socket and the socket defining a cavity which is coaxial with the male end and defines with the male end an annular space and includes a substantially cylindrical surface, a sealing element having at least one portion which is disposed in the cavity and is in direct radial contact with the male end and the socket and in radially compressed condition between the male end and the socket, and means for partitioning off the sealing element from the interior of the pipes and thereby protecting the sealing element from the substance conveyed in the pipes and comprising a protective ring of flexible material placed in the cavity at an end of the cavity adjacent the body portion, and a closure ring which is of a material resisting corrosion by said substance and is disposed in the cavity between the sealing element and the protective ring, the closure ring extending radially across substantially the whole of said annular space and comprising a circumferentially continuous annular outer lip portion which has substantially the shape of a cylinder and bears against said cylindrical surface.

2. A pipe sealing joint comprising a male end of a first pipe and a socket of a second pipe, the second pipe having a body portion axially adjacent to and rigid with the socket and the socket defining a cavity which is coaxial with the male end and defines with the male end an annular space and includes a substantially cylindrical surface, a sealing element having at least one portion which is disposed in the cavity and is in direct radial contact with the male end and the socket and in radially compressed condition between the male end and the socket, and means for partitioning off the sealing element from the interior of the pipes and thereby protecting the sealing element from the substance conveyed in the pipes and comprising a protective ring of flexible material placed in the cavity at an end of the cavity adjacent the body portion, and a closure ring which is of a material resisting corrosion by said substance and is disposed in the cavity between the sealing element and the protective ring, the closure ring extending radially across substantially the whole of said annular space and comprising an L-shaped portion in axial section which defines an outer circumferentially continuous annular lip portion having a substantially cylindrical general shape and bearing against said cylindrical surface of the cavity of the socket between the sealing element and the protective ring and an annular web portion which adjoins said lip portion and is transverse with respect to the axis of the pipes.

3. A joint as claimed in claim 2, wherein the outer lip portion of the closure ring is slightly frustoconical and divergent in a direction away from the annular web portion.

4. A joint as claimed in claim 2, wherein the web portion of the closure ring lies against the protective ring.

5. A joint as claimed in claim 4, wherein only the annular web portion of the closure ring is applied against the protective ring.

6. A joint as claimed in claim 5, wherein the median radial portion of the closure ring is in adhering relation to the protective ring.

7. A joint as claimed in claim 5, wherein the web portion of the closure ring has sufficient thickness to render it rigid.

8. A joint as claimed in claim 1, wherein the axial dimensions of the cavity, the sealing element, and the protective ring, are such that there remains a free axial space between the sealing element and the protective ring, the closure ring being disposed in said space.

9. A joint as claimed in claim 8, wherein the axial dimension of the outer lip portion of the closure ring and the axial dimension of the free axial space between the sealing element and the protective ring are such that the outer lip portion partially overlaps the sealing element.

10. A joint as claimed in claim 2, wherein the web portion has a radially inner peripheral edge which is very close to the male end without being however in contact with the male end.

11. A pipe sealing joint comprising a male end of a first pipe and a socket of a second pipe, the second pipe having a body portion axially adjacent to and rigid with the socket and the socket defining a cavity which is coaxial with the male end and defines with the male end an annular space and includes a substantially cylindrical surface, a sealing element having at least one portion which is disposed in the cavity and is in direct radial contact with the male end and the socket and in radially compressed condition between the male end and the socket, and means for partitioning off the sealing element from the interior of the pipes and thereby protecting the sealing element from the substance conveyed in the pipes and comprising a protective ring of flexible material placed in the cavity at an end of the cavity adjacent the body portion, and a closure ring which is of a material resisting corrosion by said substance and is disposed in the cavity between the sealing element and the protective ring, the closure ring extending radially across the whole of said annular space and comprising an outer circumferentially continuous annular lip portion having a substantially cylindrical general shape and bearing against said cylindrical surface of the cavity of the socket between the sealing element and the protective ring, an annular web portion which adjoins said lip portion and is transverse with respect to the axis of the pipes and a circumferentially continuous inner lip portion which extends from the web portion and is disposed axially on the opposite side of the web portion to the outer lip portion and has a substantially cylindrical general shape, the male end having a substantially cylindrical outer surface and the inner lip portion bearing against the cylindrical surface of the male end.

12. A joint as claimed in claim 11, wherein the inner lip portion of the protective ring is slightly frustoconical and convergent in a direction away from the web portion and bears against said cylindrical surface in an annular continuous portion defining a free peripheral edge of the outer lip portion.

13. A joint as claimed in claim 12, wherein the inner lip portion of the closure ring has a radially inner free edge which has a diameter less than the outside diameter of the male end in the free state of the closure ring before introduction of the male end into the closure ring whereby the inner lip portion grips the male end in the assembled joint.

14. A joint as claimed in claim 2, wherein the outer lip portion of the closure ring has a radially outer free edge which has an outside diameter which is greater than the inside diameter of said cylindrical surface of the cavity in the free state of the closure ring before its introduction into the cavity whereby the outer lip portion is applied radially tightly against said cylindrical surface in the assembled joint.

15. A joint as claimed in claim 1, wherein the closure ring is a thin hot-formed sheet of an elastic substance.

16. A joint as claimed in claim 1, wherein the closure ring is a moulded elastic material.

17. A joint as claimed in claim 1, wherein the closure ring is composed of polyamide.

18. A pipe sealing joint comprising a male end of a first pipe and a socket of a second pipe, the second pipe having a body portion axially adjacent to and rigid with the socket and the socket defining a cavity which is coaxial with the male end and defines with the male end an annular space and includes a substantially cylindrical surface, a sealing element having at least one portion which is disposed in the cavity and is in direct radial contact with the male end and the socket and in radially compressed condition between the male end and the socket, and means for partitioning off the sealing element from the interior of the pipes and thereby protecting the sealing element from the substance conveyed in the pipes and comprising a protective ring of flexible material placed in the cavity at an end of the cavity adjacent the body portion, and a closure ring which is of a material resisting corrosion by said substance and is disposed in the cavity between the sealing element and the protective ring, the closure ring extending radially across substantially the whole of said annular space and comprising a circumferentially continuous annular outer lip portion which has substantially the shape of a cylinder and bears against said cylindrical surface, and an annular member which has an L-shaped section and is made from the same material as the closure ring and covers the protective ring on a radially outer face of the protective ring and on a face of the protective ring facing the body of the pipe, the annular member having a radially extending annular portion which has an inner peripheral edge which is very close to the male end without however touching the male end.

19. A joint as claimed in claim 1, further comprising a metal coil spring having non-contacting coils embedded in an inner edge portion of the protective ring and facing the body part of the pipe.

* * * * *